US011119713B2

(12) United States Patent
Matysiak et al.

(10) Patent No.: US 11,119,713 B2
(45) Date of Patent: Sep. 14, 2021

(54) SYSTEMS, PROCESSES, AND COMPUTER PROGRAM PRODUCTS FOR DELIVERY OF PRINTED PAPER BY ROBOT

(71) Applicant: KYOCERA Document Solutions Inc., Osaka (JP)

(72) Inventors: Jacek Joseph Matysiak, Concord, CA (US); Dilinur Wushour, Clayton, CA (US)

(73) Assignee: KYOCERA Document Solutions Inc.

( * ) Notice: Subject to any disclaimer, the term of this patent is extended or adjusted under 35 U.S.C. 154(b) by 71 days.

(21) Appl. No.: 16/666,917

(22) Filed: Oct. 29, 2019

(65) Prior Publication Data

US 2021/0124539 A1 Apr. 29, 2021

(51) Int. Cl.
*G06F 3/12* (2006.01)
*G05D 1/00* (2006.01)
*G05D 1/02* (2020.01)

(52) U.S. Cl.
CPC ......... *G06F 3/1268* (2013.01); *G05D 1/0088* (2013.01); *G05D 1/0219* (2013.01); *G05D 1/0225* (2013.01); *G05D 1/0274* (2013.01); *G06F 3/1204* (2013.01); *G06F 3/1294* (2013.01)

(58) Field of Classification Search
CPC .......................... G06F 3/1268; G05D 1/0088
See application file for complete search history.

(56) References Cited

U.S. PATENT DOCUMENTS

| 8,749,816 | B2 | 6/2014 | Sunada et al. | |
|---|---|---|---|---|
| 9,971,854 | B1* | 5/2018 | Bowen | G06F 3/0482 |
| 2005/0174349 | A1 | 8/2005 | Watson | |
| 2009/0143910 | A1* | 6/2009 | Seo | B41J 13/106 700/245 |
| 2014/0280505 | A1 | 9/2014 | Cronin | |
| 2018/0033329 | A1 | 2/2018 | Suleiman | |
| 2018/0104816 | A1* | 4/2018 | Tokuchi | B25J 9/163 |
| 2018/0115681 | A1 | 4/2018 | Ohashi | |
| 2018/0165867 | A1 | 6/2018 | Kuhn et al. | |
| 2019/0088162 | A1* | 3/2019 | Meglan | G09B 9/00 |

* cited by examiner

*Primary Examiner* — King Y Poon
*Assistant Examiner* — Michael Burleson
(74) *Attorney, Agent, or Firm* — Law Office of Alexis J Saenz

(57) ABSTRACT

Embodiments provide automatic printing and delivery of a printed document from a virtual reality (VR) environment. The printed document may be delivered to the user while preserving the user's immersion within a virtual reality session. A printed-out copy of the document may be physically delivered to the user by a robot. In some embodiments, a virtual reality server may coordinate requests for printed documents, provide print and delivery status updates within the VR space, and control the robot's path to the delivery site.

17 Claims, 8 Drawing Sheets

SYSTEMS, PROCESSES, AND COMPUTER PROGRAM PRODUCTS FOR DELIVERY OF PRINTED PAPER BY ROBOT

CROSS-REFERENCE TO RELATED APPLICATION

None.

FIELD

The subject disclosure relates to virtual reality systems and more particularly to systems, processes, and computer program products for delivery of printed paper by robot.

BACKGROUND

Office workers in the future may use virtual reality (VR) headsets for large virtual workspaces. VR headsets are often connected by wire or wirelessly to VR compatible computer hardware. Workers may find it difficult to safely traverse an office while immersed in VR. Users working with VR headsets may wish to print documents, but without having to leave VR to then physically interact with a print device. Taking off the VR headset and normally approaching a print device will prevent the user from continuing their VR based work. Additionally, there may be a productivity cost related to the context switch as the user must reacquaint themselves with the state of their work and their previous train of thought. Therefore, a system allowing the VR office worker to remain in VR while ordering and receiving printed content would be beneficial to the worker's productivity and safety.

SUMMARY

In one aspect of the disclosure, a document retrieval system for retrieving printed documents is disclosed. The system comprises: a virtual reality (VR) system; a user interface (UI) including a print request function in the VR system; a printer in communication with the VR system; a robot in communication with the printer or the VR system, and a computing device in communication with the VR system, the printer, and the robot, wherein in response to a user of the VR system triggering the UI print request function, the printer prints a document and the robot is configured to retrieve the printed document from the printer and deliver the printed document to a predetermined location.

In another aspect of the disclosure, a computer program product to deliver printed documents to a user is disclosed. The computer program product comprises a non-transitory computer readable storage medium having computer readable program code embodied therewith. The computer readable program code is configured, when executed by a processing unit, to: receive through a user interface (UI) of a virtual reality (VR) system, a request to print a document accessed through the VR system; electronically forward to a printer, the request to print the document; receive from the printer, a first acknowledgement that the document has been printed; transmit a message to a robot, to retrieve the printed document; receive from the robot, a second acknowledgement that the printed document has been retrieved; and navigate the robot with the retrieved printed document to the user.

In yet another aspect, a method of delivering printed documents to a user is disclosed. The method comprises: receiving through a user interface (UI) of a virtual reality (VR) system, a request to print a document accessed through the VR system; electronically forwarding to a printer, the request to print the document; receiving from the printer, a first acknowledgement that the document has been printed; transmitting a message to a robot, to retrieve the printed document; receiving from the robot, a second acknowledgement that the document has been retrieved; and navigating the robot with the retrieved printed document to the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of virtual reality.

Generally, embodiments of the subject technology provide automatic printing and delivery of a printed document while preserving a user's immersion within a virtual reality session. A printed-out copy of the document may be physically delivered to the user. In an exemplary embodiment, a robot may deliver the printed document. A user who wishes to print content of their choosing may do so from a virtual reality interface and may take possession of said content while remaining immersed in the VR experience.

Figure 1:
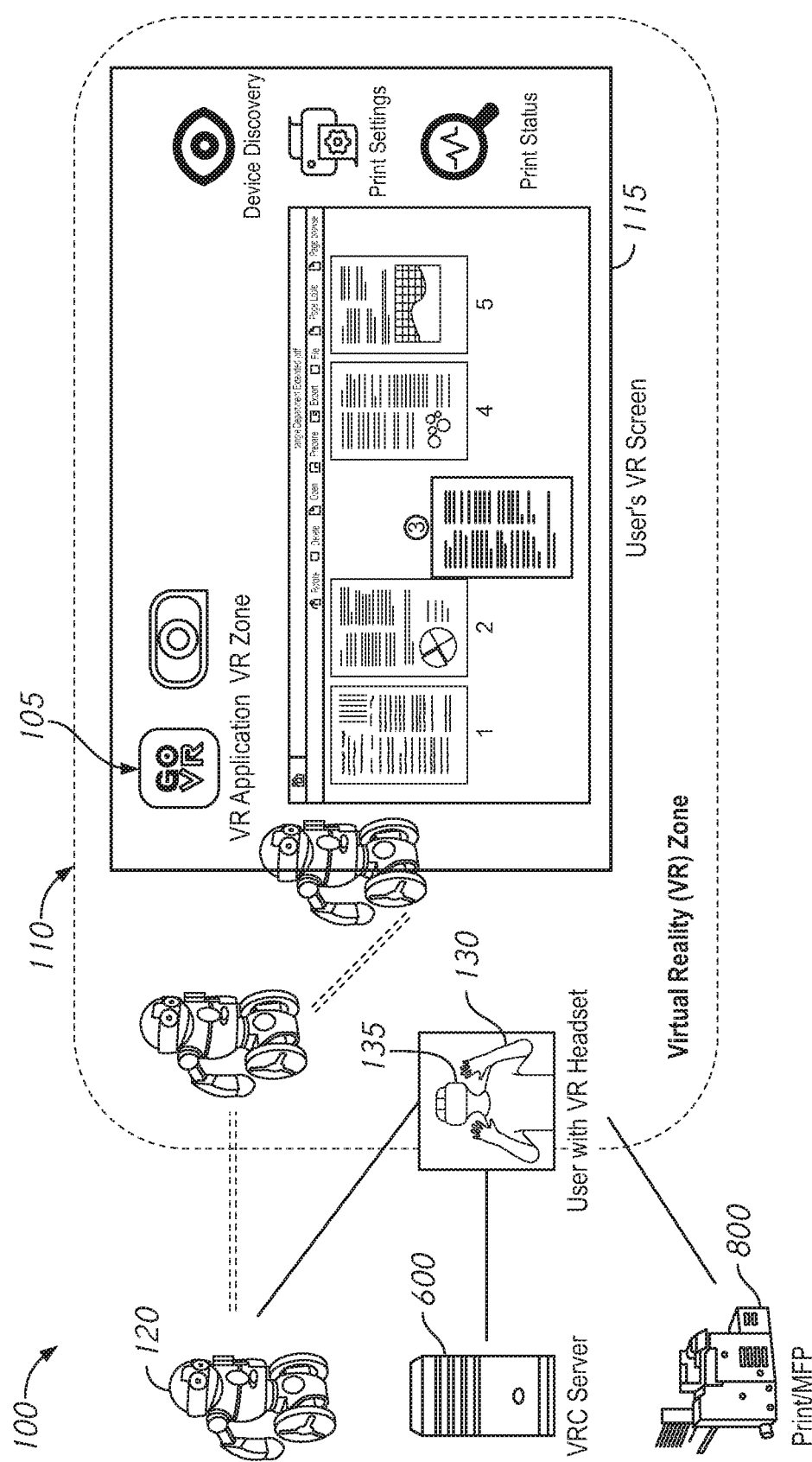
FIG. 1 is a diagrammatic view of a virtual reality system for delivering a printed document according to an exemplary embodiment.

Referring now to FIG. 1, a document retrieval system 100 (sometimes referred to generally as the "system 100") is shown according to an exemplary embodiment. The system 100 may include for example, a VR App 105 which may include an integrated VR user interface (UI) 115, a robot 120, a VR system 135, a printer (or multifunction printer (MFP)) 800 in communication with the VR system 135, and a computing device 600 in communication with the robot 120, the VR system 135, and the printer 800.

A user 130 may engage with the VR App 105 through the VR user interface 115 by donning the VR system 135. In the description that follows, reference to using the VR App 105 may sometimes be done interchangeably with reference to the VR user interface 115 since many of the user actions will be performed via the user interface. In an exemplary embodiment, the VR UI 115 may be a fully immersive interface. The VR UI 115 may be displayed within a virtual reality space 110 that may include VR elements other than the VR UI 115. The VR UI 115 may be configured with selectable elements which trigger various functions while the user 130 is engaged with the system. In an exemplary embodiment, VR UI 115 includes a selectable print function which may be configured to trigger print a document and trigger automatic delivery of the printed paper copy of the document to the user 130. The VR system 135 may include a menu function that allows the user 130 to select print content such as documents from a list of documents known to the VR system 135. The VR system 135 can access documents in the file system as allowed by the operation system and system constraints. The user 130 may also load Internet/network documents in the VR system 135 by accessing links and downloading the content within the VR system 135. Once one or more documents are selected for printing, the user 130 may select a specific print device 800, or simply select any available "capable" print device 800.

The user 130 may use VR controllers in the UI 115 to hover over and select 2D or 3D objects representing documents in 3D space to select documents. The user 130 may also use hand gestures instead of VR controllers when a headset supports inside-out tracking. The user 130 may also utilize natural language processing utterances to specify which documents they wish to select. For example, a user 130 may utter "I would like the TPS report from August 15th of this year". The VR system 135 would understand to display a file labelled TPS report that was created around August 15th. The user 130 would be shown a representation of this document for verification and could reply "Yes" or "No", for example, to specify whether it is the intended document.

The VR system 135 may be a headset (or other VR system) which is connected to a VR compatible computing device 600. In some embodiments, the VR headset and VR compatible computing device 600 may be one unit. The VR compatible computing device 600 may be local to the user (for example, a desktop computer at station of the user 130) or may be a remotely connected computer (for example, a VR server coordinating VR sessions, print jobs, and print deliveries). For purposes of illustration, the VR computing device will be described as a VR server 600 in the descriptions that follow.

In an example application, the user 130 is in an office environment. While at their desk, the user 130 may be engaged in an immersive VR session performing work functions (for example, attending a virtual collaboration meeting with a co-worker). The two colleagues may have cooperatively produced a joint document that is part of a larger project being discussed within the VR session. The user 130 may want to print out the joint document for review at a later time while remaining in the meeting. The user may make a print request, which is sent to a network print machine. The robot 120 may retrieve the printed document and may navigate to the user (or another predetermined location) to drop off the document. Office environments typically have well defined walkways that a robot can use to traverse the office to the drop-off location.

To select a specific printer 800, the user 130 may be presented with a list of print devices discovered on the network that are both capable and available for robot delivery of print content. Further, a "capable" print device may be one which has paper, available toner or ink, is not in an error state, can accommodate robot delivery of print content, and is within a "reasonable" and traversable distance of the user 130 (with respect to available robots 120 and their range and capabilities). The user 130 may also choose that "any available" capable print device be selected.

When the user 130 is satisfied with their selection of documents, and have selected a printer 800, they may select print device options. The VR system 135 is configured (through a software application) to provide print device options such as color/monochrome, paper size(s), ecoprint, and so on. In some embodiments, selection may be performed via natural language commands where the user 130 makes utterances (verbal commands) such as "a color document with ecoprint mode on" while a 2D display of possible options, and their current states, is displayed. One set of print options can be applied to all documents, or each document can have its own print options.

The VR system 135 may be configured to provide users 130 with print job status notification throughout the print-and-delivery process. The "status information" may be displayed as a small overlay (UI object area for 3D controls) within the VR UI 115. the status information may include for example, estimated delivery time, any error information, and status. An icon of a flying job (paper airplane for example), print device, or moving robot may be shown. The status informs the user 130 whether the print job is being transmitted to the printer 800, whether it is waiting to be printed, whether it is printing, whether it is being transferred to the robot 120, whether the robot 120 is in transit to the print device 800, and/or whether the robot 120 is in transit to the user 130. In another embodiment, this "status information" may also be displayed in the notification UI area of the VR system 135.

The robot 120 may be in communication with the VR server 600 to provide robot status information, receive orders, and provide status updates regarding delivery jobs. The VR server 600 tracks robots, capable print devices, and eligible users. Once a user requests a print delivery job, the VR server 600 provides the VR system 135 with a list of available capable print devices 800 that can be serviced by delivery robots 120.

An exemplary robot 120 may be a ground-based robot which is capable of ground movement over flat terrain using two or more tracks at the bottom of the robot (for example, a Boston Dynamics "Handle" robot). Alternatively, the robot 120 may take a humanoid form with arms and legs (for example, the Boston Dynamics "Atlas" robot). The robot 120 may be electrically-battery powered and may return to a power station (not shown) for recharging. The VR server 600 may be kept informed of the robot's power status and the VR server 600 may decide when to send the robot 120 for recharging. Robot failures may also be reported to the VR server 600 such that it may alert designated persons of the issue (for example administrators). The ground movement capability allows the robot 120 to move to and from the charging station, printers 800, and areas where users 130 request print content be delivered.

The robot 120 may have sensors to detect surroundings, proper flexibility and movement (arm and clasp) to traverse the office-scape and conduct stack of paper pickup and delivery. The robot 120 may be in possession of 'cognitive' abilities (object recognition, voice recognition, motor skills, language skills, understanding skills, etc.) which allow it to traverse an office-scape independently.

Generally, the capable print device 800 and robot 120 may communicate via the intermediary VR server 600. However, in other embodiments, the print device 800 and robot 120 may communicate directly with one another. See FIG. 6.

The robot 120 may move to a capable printer 800 where the robot 120 may use a robotic arm to move stacks of paper (1 or more pages) from a print device's output tray. In some embodiments, the robot 120 may include its own internal tray. Once a robot 120 receives a print delivery job order it may travel to the specified printer 800. The VR server 600 may wait until the robot 120 is in position to pick up the printed document before starting the print process. The robot 120 may interrogate its surroundings while moving to do so safely. Once the specified printer 800 is reached, the robot 120 may determine if it may safely approach the printer's output tray. If so, the robot 120 may move into a docking position where it can wirelessly communicate with the printer 800 (via Wifi-direct, NFC, etc.) and close enough so that its robotic arm can grip/clasp the stack of papers in the output tray. The robot 120 may inform the VR server 600 it is in position to pick up paper. The printer 800 may begin the print job (if it has not done so already). In an alternate embodiment, the robot 120 informs printer 800 directly that the robot 120 is ready to pick up a print job. The printer 800 may be programmed to wait for this confirmation before printing out the document. The robot 120 may place its robotic arm in position to clasp the stack of paper output from the printer 800. The printer's output tray may have a portion cut out so the bottom of the robot's clasping mechanism can enter there below the paper stack. The cut out may be a bit larger than the robot's rectangular clasp mechanism. The printer 800 may inform the VR server 600 that the print job has been printed and the robot 120 may take possession. The VR server 600 may inform the robot 120 that it has permission to take delivery of the print job, and the robot 120 takes possession by clasping its arm around the stack of paper and placing it into an internal tray. In another embodiment, the printer 800 may begin printing as soon as the print job is sent. In this embodiment the robot 120 may place its clasp around the stack of paper after the VR server 600 informs the robot 120 that the print job is ready to be picked up from the printer 800. The VR server 600 may instruct the robot 120 of the delivery destination. The robot 120 traverses the office environment to the destination.

Once the robot 120 is within a short distance of the intended delivery area (for example within 15 feet), the VR system 135 may display a 3D visual representation of the robot 120 in the VR space 110. The VR system 135 may use proximity sensors to map and re-create an approximation of the user's physical environment (for example, walls, doors, large objects, desk, etc.) in real time. The user 130 may see a wireframe (or textured version) of their environment including a 3D model/avatar for the robot 120 ("re-created environment"). Alternatively, the user 130 may see a ("combination view") of live view (what cameras on the VR headset see from the exterior of the VR system 135) and an overlaid wireframe of major features of the mapped environment (using depth sensors). The wireframe is useful for designating a delivery location and the user's safe traversal of the physical environment if they interact with the robot 120. Audio and visual cues may be used to bring the user's attention to the robot's location and intended path. The intended path is relayed either via the VRC server or via Wi-Fi-direct (or similar technology) to the user 130. The path is drawn visually into the recreated environment or combination view. The "status information" icon and information that was displayed in part of the user's VR space 110 may then prompt the user 130 how the robot 120 should deliver the print job. The user 130 may choose from several options such as: (1) Place the stack of papers into the robot's arm and extend the stack of papers to within 2 or 3 feet of the user 130. The user 130 may verbally instruct the robot 120 to let go of the stack and conclude the delivery. The user 130 can see a 3D model; (2) The robot 120 is stationary and allows the user 130 to approach the robot's "pouch". The user 130 then manually removes the stack of paper completing delivery; (3) Instruct the robot 120 to place the stack of papers in a specific location in the re-created environment or combination view. For example, the user 130 may use controllers to move a cursor to the intended delivery location and press a designated button. A gaze-based cursor plus gesture selection version may also be available. Whatever the user 130 chooses as a location, the stack of papers and robot 120 are clearly represented in the user's VR space 110.

Upon transfer of the stack of papers, the user 130 can dismiss the robot 120. This may be done verbally. Alternatively, a controller can be used to select the "status information" area and then long pressing the "status information" will display an option to "Dismiss robot". Alternatively, instead of a controller, hand gestures may be used. The user 130 may select this option to dismiss the robot 120. Alternatively, the VR server 600 can recall the robot 120 to a designated return location (for example, a charging dock) or may send the robot 120 to perform another pickup and delivery. The robot 120 is responsible for safe traversal of the environment.

As may be appreciated by the description above, implementation of methods may be carried out under various alternative embodiments. For the following flowcharts, steps of the processes may be referred to as blocks. As will be described further below, steps may be performed by a machine, for example, a computing device, an image forming apparatus, and/or a processing unit. While the steps may be described in one order, it will be understood that variations to the order may be practiced or the order in which claims below are written may vary from the following without departing from the scope of the invention.

Figure 2:
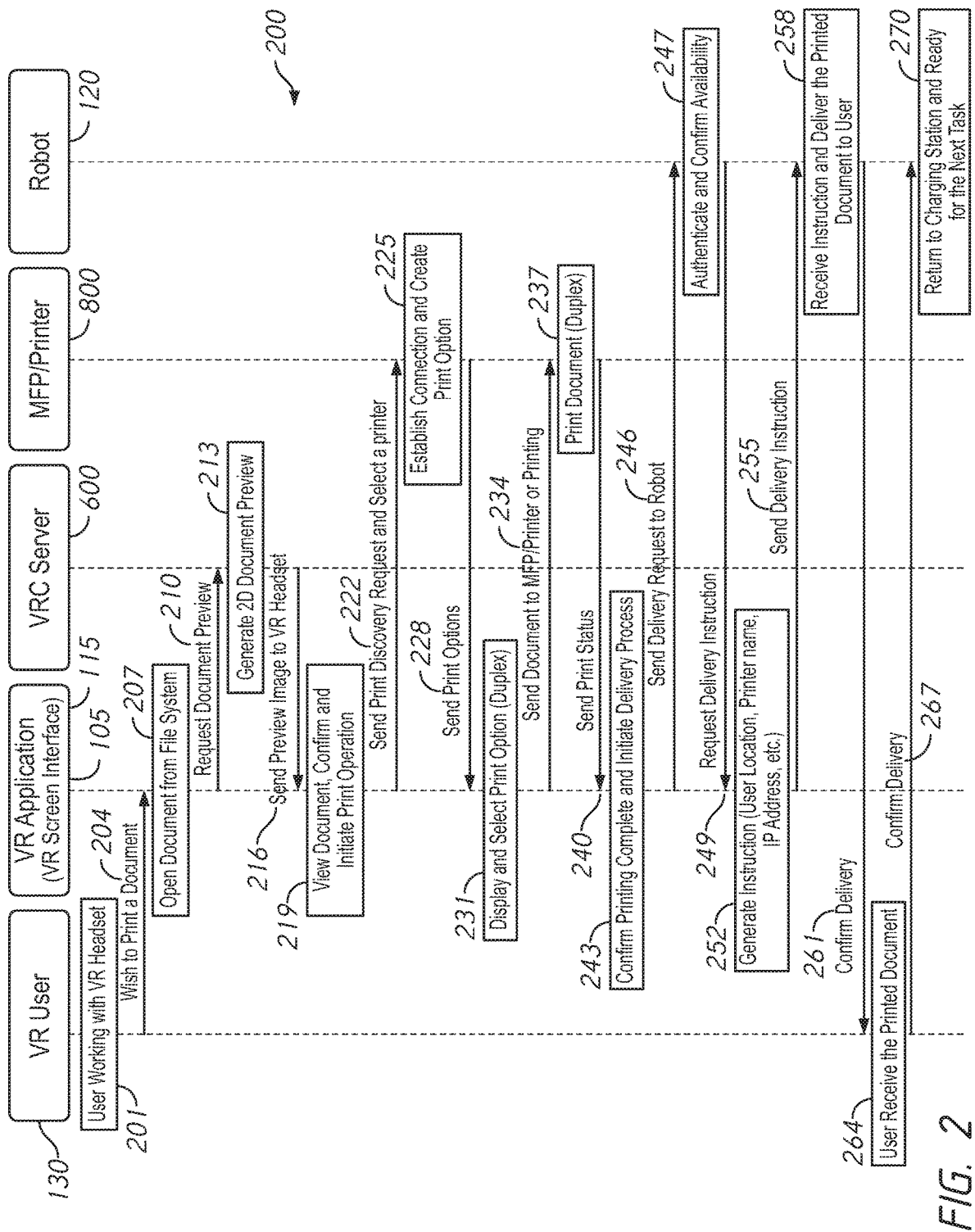
FIG. 2 is a flowchart of a method for delivering a printed document in accordance with an embodiment of the subject technology.

Referring now to FIG. 2, a method 200 of delivering printed documents to a user is shown according to an exemplary embodiment. FIG. 2 shows a sequence diagram of steps that may occur between elements in a system embodiment. The system elements may include the VR UI 115, the VR server 600, the printer 800, and the robot 120. In general, the method begins with the user 130 operating 201 a VR device (for example, the VR system 135 of FIG. 1). While working within a VR space, the user 130 triggers 204 a request for a printed document. In some embodiments, the VR system 135 may open 207 an electronic copy of the requested document from a file system. In some embodiments, the user may request 210 a preview of the document. An electronic copy of the document may be retrieved from the VR server 600. The VR server 600 may generate 213 a two-dimensional image of the document for preview. The VR server 600 may send 216 the image to the VR system 135. In the VR space, the user may preview the document, confirm the document is desired to be printed, and initiate 219 the print operation. The VR UI 115 may send 222 the print request to a selected printer 800. The printer 800 may be manually selected by the user or may be automatically selected by the system. The VR UI 115 may establish 225 a connection to the printer 800. The printer 800 may create the print option, which may be sent 228 back to the VR UI 115 for selection by the user. The VR UI 115 may display 231 the print options. The user may select one of the print options which is sent 234 back to the printer 800 for printing the document. The printer 800 may provide 240 a print status to the user viewable in the VR UI 115. In some embodiments, once the print status reaches completion, the user may acknowledge 243 that the printed document should be delivered. The delivery request may be sent 246 from the VR UI to the robot 120. The robot 120 may authenticate the request is valid and may acknowledge 247 its availability to deliver the printed document. In some embodiments, a handshake between the robot 120 and the VR system may occur. The robot 120 may request 249 delivery instructions. The VR system may generate 252 the delivery instructions. The instructions may include for example, the user's location, the printer name where the document was printed and being held, the IP address of devices involved in the transaction and any other information the robot may need to pick up the document, navigate within the physical environment, and arrive to the drop-off location. The delivery instructions may be sent 255 to the robot 120 which may then deliver 258 the printed document to the user 130 using the instructions. The robot 120 may confirm 261 delivery once the printed document is dropped-off. The user 130 may receive 264 the document and may confirm 267 receipt of the delivery through the VR UI 115. In some embodiments, the robot 120 may return 270 to a predetermined location, which may be for example, a charging station as it waits for its next task.

In the flowcharts that follow, alternate embodiments of methods of delivering printed documents to a user are shown. The alternate methods are similar to the method 200 but include a few variations in steps. Accordingly, it will be understood that steps in the following methods that are the same as steps in the method 200 (or in any previously discussed method in the sequence) may not be discussed to save repetition of the same details. In addition, steps that are the same as steps in the method 200 (or in any previously discussed method in the sequence) may use a similar number as the number used in FIG. 2 but may be called out with a number of the same series as the reference number of the method of the current figure being discussed. For example, block 301 in method 300 may be the same as block 201 in Method 200. Accordingly, block 401 and block 501 may also be the same step as block 201 but are labeled for consistency with their respective method series numbers. As another example, block 450 in method 400 may be the same as block 350 described in method 300.

Figure 3:
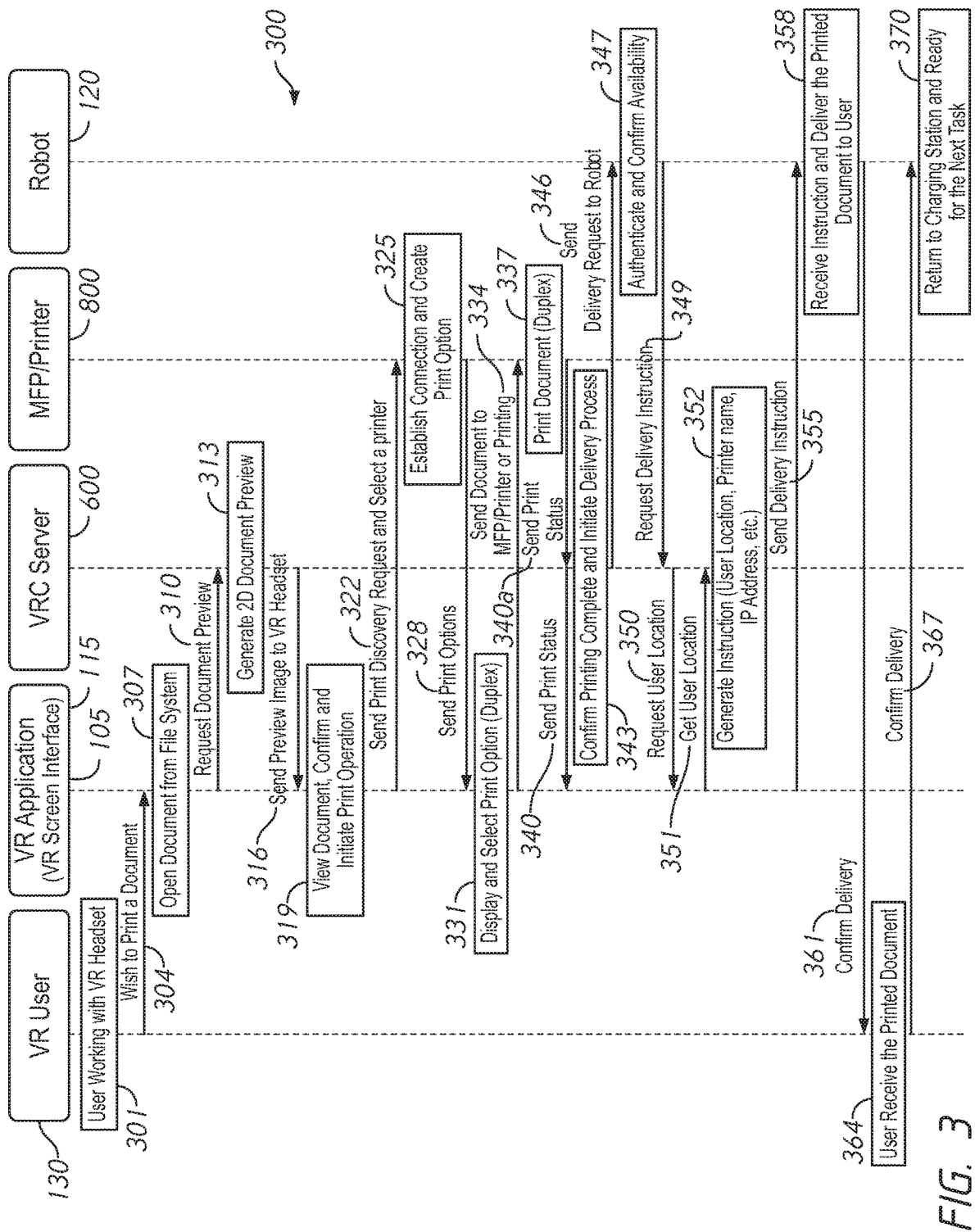
FIG. 3 is a flowchart of a method for delivering a printed document in accordance with another embodiment of the subject technology.

Referring now to FIG. 3, a method 300 of delivering printed documents to a user is shown according to another exemplary embodiment. In method 300, the VR App accessed through the VR UI 115 can send a document to the VR Server 600 for document preview. In block 334 ("Send document to MFP/Printer for printing"), the printer 800 may obtain print content from the VR Server 600. In some embodiments, the print content may be data local to the VR system 135. The VR Server 600 may retrieve any unobtained print content from the VR app. In comparison to method 200 where information from the printer 800 may be sent directly to the user 130/VR UI 115, the method 300 may use the VR server 600 as an intermediary element for coordinating the delivery of the printed document. As the document is being printed, the printer 800 may send 340a, a print status report to the VR server 600, which may relay 340 the print status to the VR UI 115. This may differ from method 200 which may send the print status report directly from the printer to the VR UI 115. Confirming 343 that printing is complete may occur at the VR server 600, which may request 346 the delivery from the robot 120. The robot's request 349 for delivery instruction may be made with the VR server 600. The VR server 600 may request 350 from the VR UI 115, the user's location. The user's location may be received 351 by the VR server 600 (as provided by the VR UI 115). The VR server 600 may generate 352 the delivery instructions provided to the robot 120. At which point, the method 300 may resume a process similar to that described in method 200.

Figure 4:
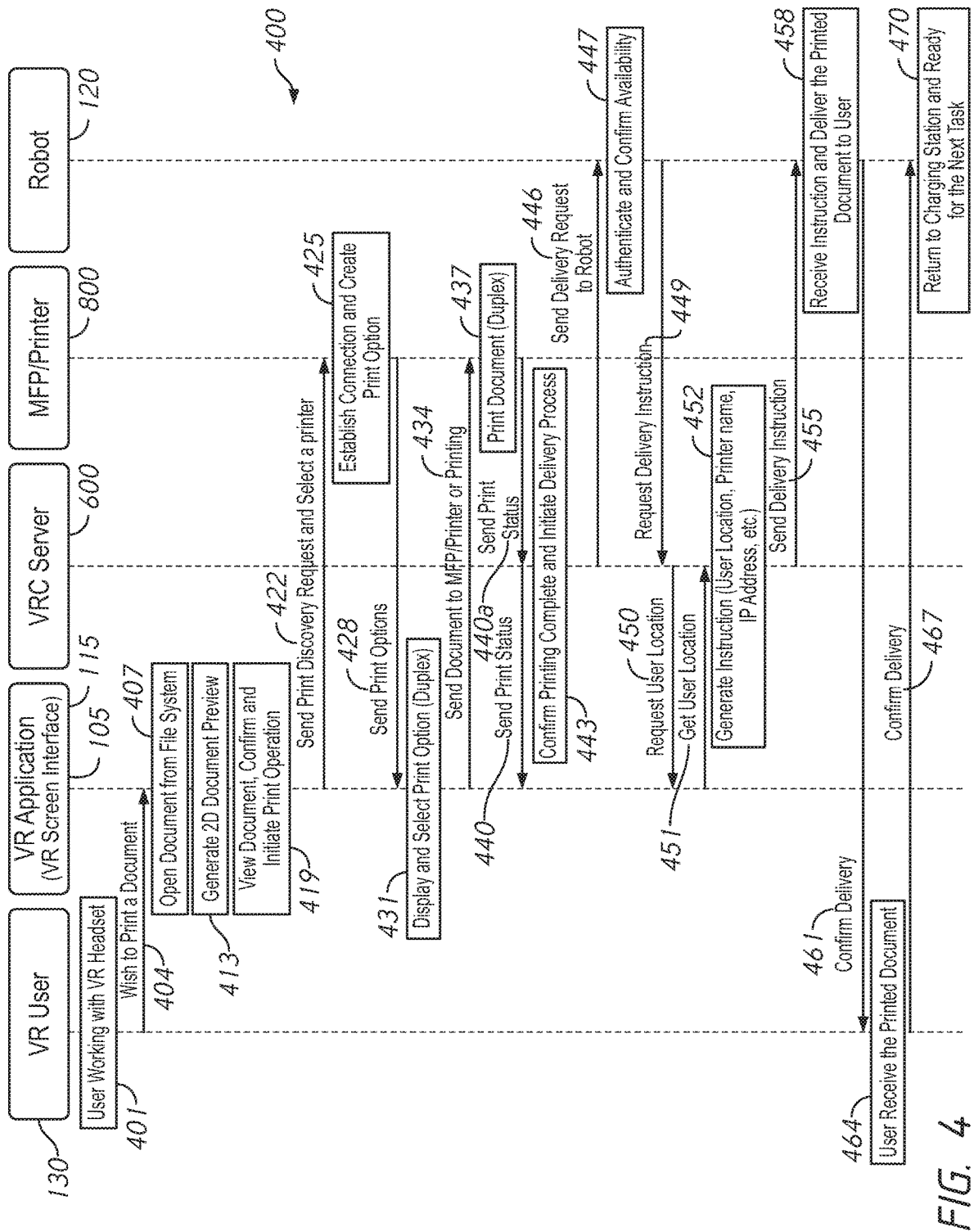
FIG. 4 is a flowchart of a method for delivering a printed document in accordance with yet another embodiment of the subject technology.

Referring now to FIG. 4, the method 400 is similar to method 300 except that the VRC App may render its own document previews and is capable of sending document(s) directly to the printer 800. The variation may be seen at the step 413 (analogous to steps 213 and 313, "Generate 2D Document preview"), which generated the preview by the VR server 600. In method 400, the VR UI 115 may generate 413 the document preview, which eliminates the analogous step of blocks 216 or 316 of the previous methods. The remainder of method 400 is shown as proceeding in the same process as method 300. However, it will be understood that the method 400 may proceed in the same process thereafter from block 213 as in method 200.

Figure 5:
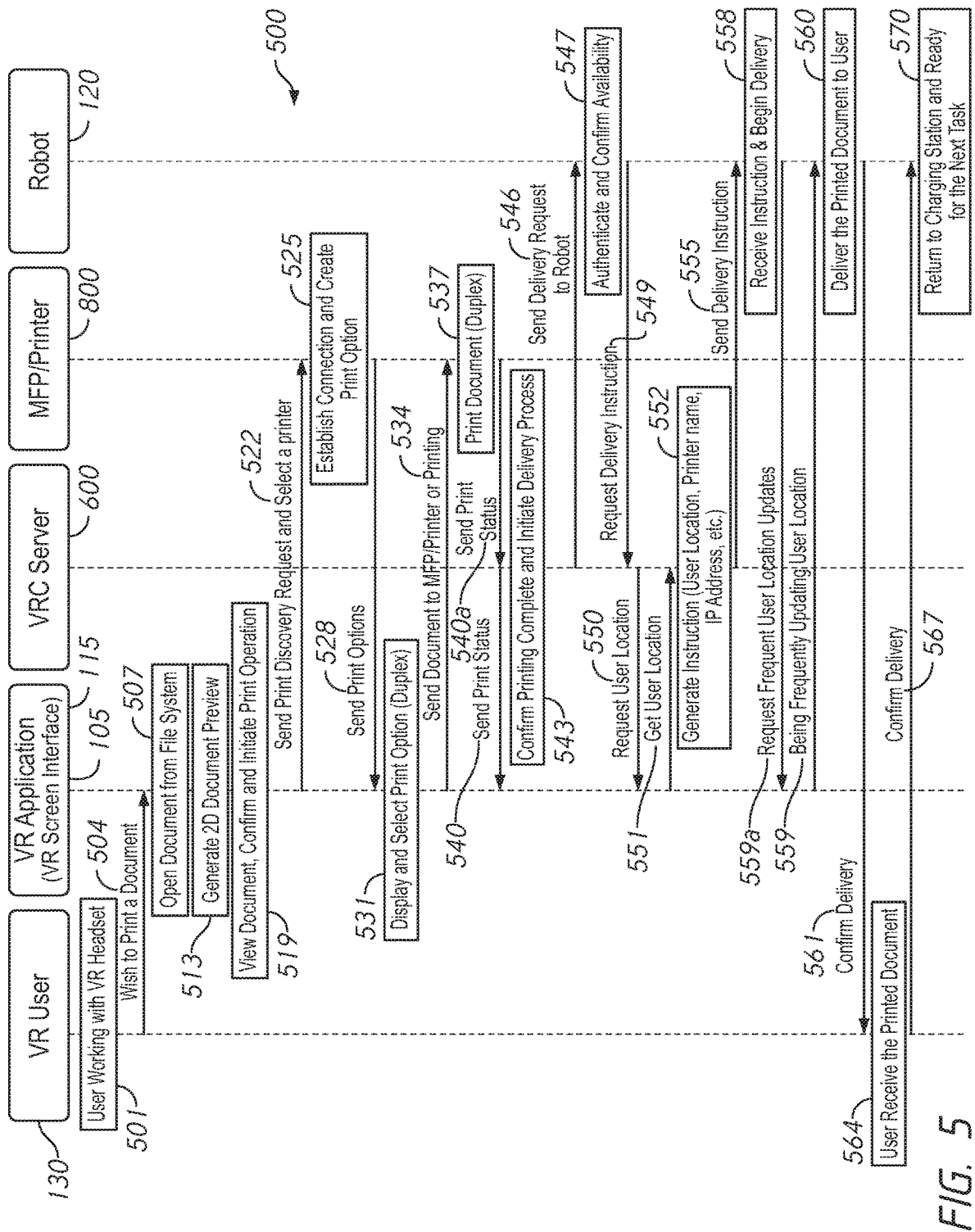
FIG. 5 is a flowchart of a method for delivering a printed document in accordance with still yet another embodiment of the subject technology.

Referring now to FIG. 5, the method 500 is similar to method 400 except that the robot 120 may request frequent user location updates from the VR server 600 (for delivery). The variation may be seen after block 558 where the robot 120 receives the instruction to begin travelling to deliver the printed document. In the method 500, the robot 120 may request 559a the current user's location. The request 559a may be made more than once and frequently. As may be appreciated, this feature may allow the user 130 to move about their office space and yet still receive the printed document in a different location from where the user originally made the request. For example, the user 130 may request the printed document from their desk (or wherever they may be at the time) so it can be shown to a co-worker. The user 130 may travel to the co-worker's physical space. Meanwhile, the print job may be performed and the robot 120 may be frequently updated 559 by the VR app as the robot travels to meet the user 130 en route to or at the co-worker's space where the printed document is delivered 560.

Figure 6:
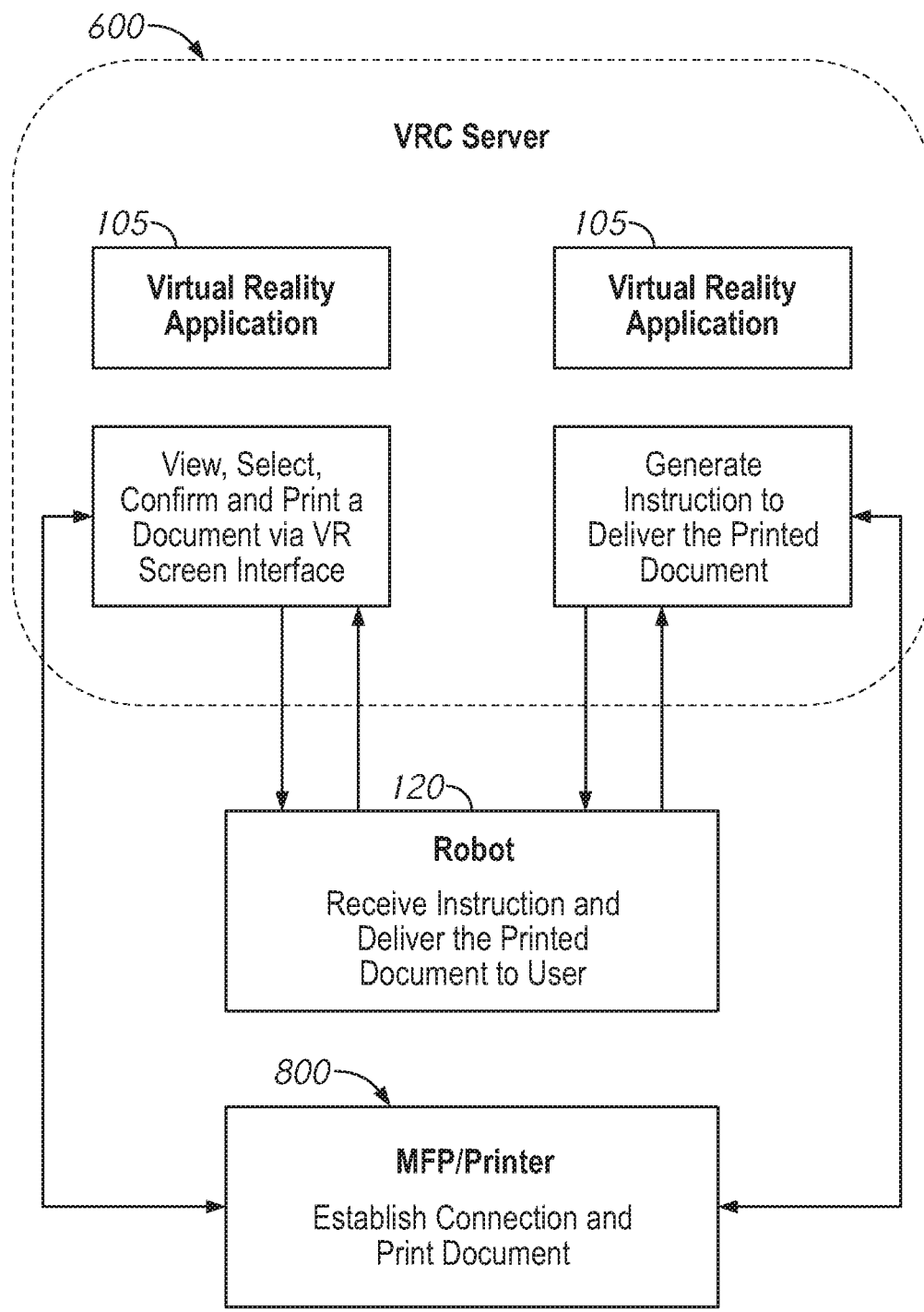
FIG. 6 is a block diagram of communication relationships among elements of a system in accordance with embodiments of the subject technology.

Referring now to FIG. 6, a block diagram of a system is shown according to an exemplary embodiment. In the embodiment, different relationships in communication between the VR server 600, the VR App 105, the robot 120, and the printer 800 are shown, which may represent the different means to perform steps described in methods 200, 300, 400, and 500 discussed above.

Figure 7:
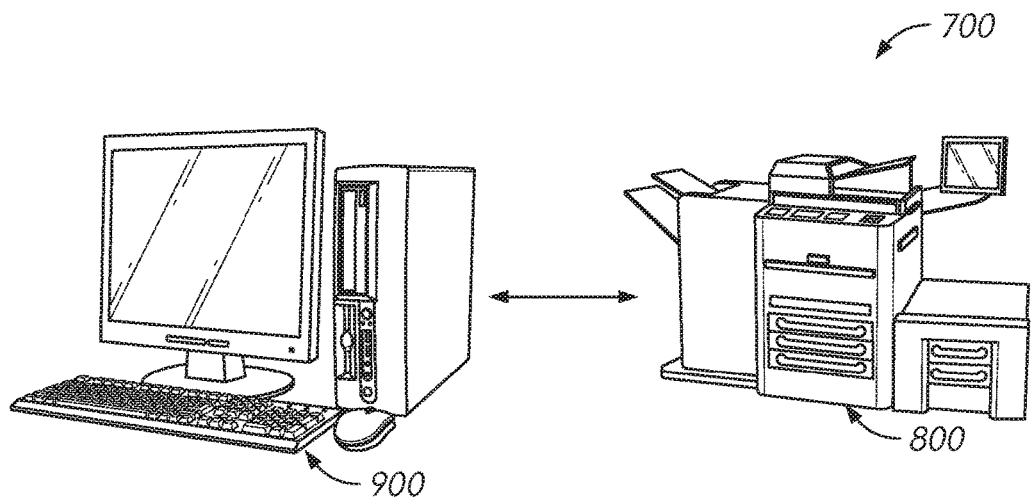
FIG. 7 is a schematic of a print job system in accordance with an embodiment of the subject technology.
Figure 8:
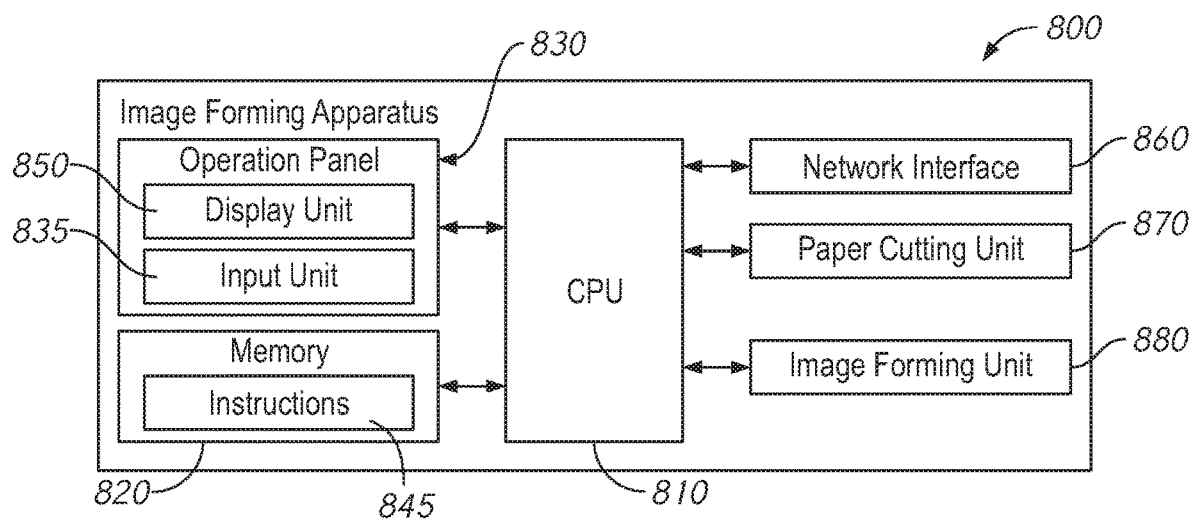
FIG. 8 is a block diagram of a printer or MFP in accordance with an embodiment of the subject technology.
Figure 9:
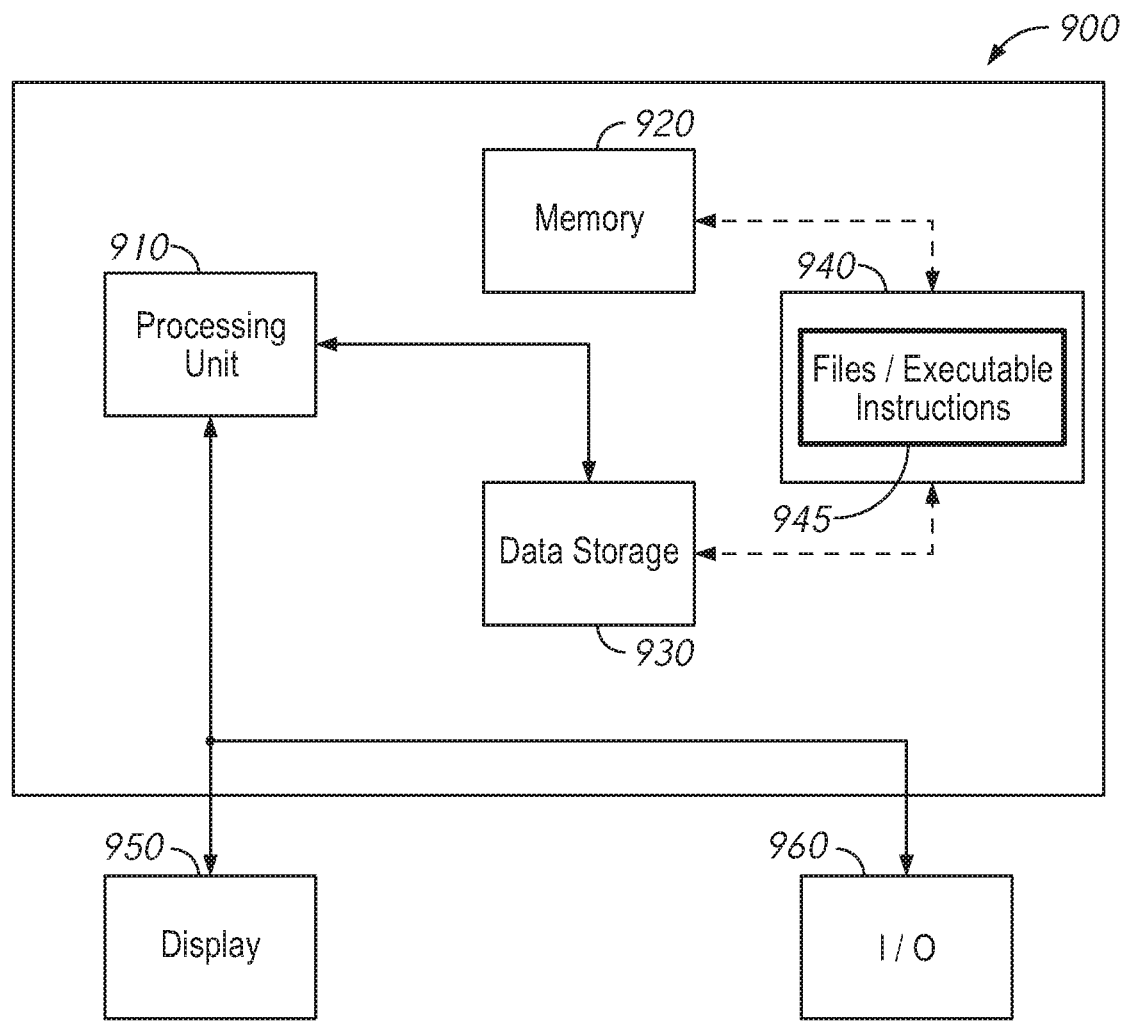
FIG. 9 is a block diagram of a computing device in accordance with embodiments of the subject technology.

Referring now to FIGS. 7-9, system and machines of the subject technology are shown according to exemplary embodiments. A system 700 is shown in FIG. 7 which may include the printer/MFP 800 connected to a computing device 900. In some embodiments, the above described process(es) may be loaded as executable instructions into one or both of the printer/MFP 800 and the computing device 900. FIG. 8 shows a schematic example of the printer/MFP 800 in block diagram form. FIG. 9 shows a schematic example of a computing device 900. It will be understood that multiple instances of the computing device 900 may be connected to the same printer/MFP 800, however, for sake of illustration, a single computing device 900 is shown.

The printer/MFP 800 may be for example, a computing based image processing and printing device that can receive print job requests (for example, a printer, a fax machine, a copier machine). The components of the printer/MFP 800, may include, but are not limited to, one or more processors or processing units 810, a system memory 820, an operation panel 830, an input unit 835, a set of program modules 845 including files and executable instructions, a display unit 850, a network interface 860, a paper cutting unit 870, an image forming unit 880, and a bus system that couples various system components including the system memory 820 to the processor(s) 810. The memory storage 820 may store for example, executable instructions and/or electronic versions of the image objects to be printed. In some embodiments, the processors 810 may include a processing unit dedicated to graphics and image processing (for example a graphics processing unit (GPU) or visual processing unit (VPU). As a GPU or VPU, the processor 810 may implement executable instructions focused on image processing applications (like those related to rendering the image objects into print jobs on the page space described above) either alone or in coordination with other general processor 810 types such a CPUs, microchips, and the like.

The computing device 900 may be for example, a computer system, a computer server, or any other computing device whose functionality may be driven in at least part by a processing unit 910. For example, as it relates to the subject disclosure above, the user's local desktop (if any), the VR system 135, the VR server 600, and the printer/MFP 800 may be examples of machines which may represent forms of a computing device 900. In the role of a user device, the computing device 900 is generally not a server but may instead be desktop computers, tablet or laptop computers, all-in-one computer stations, a mobile computing device (for example, a smart phone, smart wearable devices (glasses, jewelry, watches, ear wear, etc.), virtual reality systems, or programmable electronics).

The components of the computing device 900, may include, but are not limited to, one or more processors or processing units 910, a system memory 920, data storage 930, a computer program product 940 having a set of program modules 945 including files and executable instructions, and a bus system that couples various system components including the system memory 920 to the processor(s) 910. The memory storage 920 may store for example, electronic files of the image objects to be printed. In some embodiments, the processors 910 may include a processing unit dedicated to graphics and image processing (for example a graphics processing unit (GPU) or visual processing unit (VPU). As a GPU or VPU, the processor 910 may implement executable instructions focused on image processing applications (like those related to generating virtual reality environments described above) either alone or in coordination with other general processor 910 types such a CPUs, microchips, and the like.

The computing device 900 may be described in the general context of computer system executable instructions, such as the program modules 945 which represent a software embodiment of the system and processes described generally above with respect to FIGS. 2-5. The program modules 945 generally carry out the functions and/or methodologies of embodiments as described above. The computing device 900 may typically include a variety of computer system readable media. Such media could be chosen from any available media that is accessible by the computing device 900, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 920 could include one or more computer system readable media in the form of volatile memory, such as a random-access memory (RAM) and/or a cache memory. By way of example only, the data storage system 930 may read from and write to a non-removable, non-volatile magnetic media device. The system memory 920 may include at least one program product 940 having a set (e.g., at least one) of program modules 945 that are configured to carry out the functions of embodiments of the invention in the form of computer executable instructions. The program product/utility 940, having a set (at least one) of program modules 945, may be stored in the system memory 920 by way of example, and not limitation, as an operating system, one or more application programs, other program modules, and program data. Some embodiments may generate an electronic user interface (for example, the VR UI 115) that may allow the user engage in VR operations including for example, requesting robot delivery of a printed document.

The computing device 900 may communicate with one or more external devices. In some embodiments, a display 950 may be a VR display that is part of the VR system 135. User input within the display 950 may be registered at the processor 910 and processed accordingly. Other devices may enable the computing device 900 to communicate with one or more other computing devices, either by hardwire or wirelessly. Such communication can occur via Input/Output (I/O) interfaces/ports 960. In some embodiments, the I/O interfaces/ports 960 may be specially configured to handle aspects of the embodiments described herein converting the computing device 900 into a special purpose machine. The computing device 900, through the I/O interface/ports 960, may communicate with one or more networks such as a local area network (LAN), a general wide area network (WAN), and/or a public network (e.g., the Internet) via a network adapter as is commonly known in the art.

Each of the operating system, one or more application programs, other program modules, and program data or some combination thereof, may include an implementation of a networking environment. In some embodiments, the computing device 900 may be a cloud computing node connected to a cloud computing network (not shown). The computer computing device 900 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 910 of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A document retrieval system for retrieving printed documents, comprising:
    a virtual reality (VR) system;
    a user interface (UI) including a print request function in the VR system;
    a printer in communication with the VR system;
    a robot in communication with the printer or the VR system; and
    a computing device in communication with the VR system, the printer, and the robot, wherein in response to a user of the VR system triggering the UI print request function, the printer prints a document and the robot is configured to retrieve the printed document from the printer and deliver the printed document to a predetermined location, wherein
    the user interface further includes an indicator that the printed document has been delivered, the indicator being visible to the user while the user is engaged with the VR system, and
    the user interface further includes a confirmation of receipt button configured to trigger a response message to the robot confirming receipt and sending the robot to a charging station.

2. The system of claim 1, wherein the printer is configured to send a message to the robot indicating the printed document is ready for retrieval, the message including a location of the printer and the predetermined location for delivery of the printed document.

3. The system of claim 1, wherein the computing device is configured to send a message to the robot indicating the printed document is ready for retrieval, the message including a location of the printer and the predetermined location for delivery of the printed document.

4. The system of claim 1, wherein the triggering of the print request function triggers a message from the computing device to the robot to deliver the printed document.

5. The system of claim 1, wherein:
    the computing device is configured to retrieve an address of the VR system;
    the message from the computing device to the robot includes the VR system address;

the robot is configured to navigate autonomously to the VR system address; and the predetermined location is proximate the VR system.

6. The system of claim 5, further comprising an electronic map file of an area where the VR system is located, wherein, the electronic map file stored in any of the computing device, the robot, and the VR system; and the robot navigates using a pathing program including a shortest route to the VR system through the electronic map file of the area.

7. A computer program product to deliver printed documents to a user, the computer program product comprising a non-transitory computer readable storage medium having computer readable program code embodied therewith, the computer readable program code being configured, when executed by a processing unit, to:

receive through a user interface (UI) of a virtual reality (VR) system, a request to print a document accessed through the VR system;

electronically forward to a printer, the request to print the document;

receive from the printer, a first acknowledgement that the document has been printed;

transmit a message to a robot, to retrieve the printed document;

receive from the robot, a second acknowledgement that the printed document has been retrieved; and navigate the robot with the retrieved printed document to the user; and display an indicator in the user interface that the printed document has been delivered, wherein the indicator is visible to the user while the user is engaged with the VR system, and wherein the user interface includes a confirmation of receipt button configured to trigger a response message to the robot confirming receipt and sending the robot to a charging station.

8. The computer program product of claim 7, wherein the robot is navigated to a predetermined location proximate the VR system.

9. The computer program product of claim 8, wherein the computer readable program code is further configured to:

retrieve an address of the VR system; and navigate the robot to the VR system address, wherein the predetermined location is proximate the VR system.

10. The computer program product of claim 7, wherein the computer readable program code is further configured to:

store an electronic map file of an area where the VR system is located; and navigate the robot to the VR system through the electronic map file of the area.

11. The computer program product of claim 10, wherein the computer readable program code is further configured to navigate the robot using a pathing program including a shortest route through the electronic map file of the area.

12. The computer program product of claim 7, wherein the computer readable program code is further configured to:

display a representation of the robot within a VR area replicating a user's real-world area within the VR system UI.

13. A method of delivering printed documents to a user, comprising:

receiving through a user interface (UI) of a virtual reality (VR) system, a request to print a document accessed through the VR system;

electronically forwarding to a printer, the request to print the document;

receiving from the printer, a first acknowledgement that the document has been printed;

transmitting a message to a robot, to retrieve the printed document;

receiving from the robot, a second acknowledgement that the document has been retrieved;

navigating the robot with the retrieved printed document to the user; and displaying an indicator in the user interface that the printed document has been delivered, wherein the indicator is visible to the user while the user is engaged with the VR system, and wherein the user interface includes a confirmation of receipt button configured to trigger a response message to the robot confirming receipt and sending the robot to a charging station.

14. The method of claim 13, wherein the robot is navigated to a predetermined location proximate the VR system.

15. The method of claim 14, further comprising:

retrieving an address of the VR system; and navigating the robot to the VR system address, wherein the predetermined location is proximate the VR system.

16. The method of claim 13, further comprising:

storing an electronic map file of an area where the VR system is located; and navigating the robot to the VR system through the electronic map file of the area.

17. The method of claim 16, further comprising:

navigating the robot using a pathing program including a shortest route through the electronic map file of the area.

* * * * *